(12) United States Patent
Lane et al.

(10) Patent No.: US 11,867,566 B2
(45) Date of Patent: Jan. 9, 2024

(54) SYSTEMS AND METHODS FOR TEMPERATURE DETERMINATION

(71) Applicant: Welch Allyn, Inc., Skaneateles Falls, NY (US)

(72) Inventors: John A. Lane, Weedsport, NY (US); Matthew J. Kinsley, Marcellus, NY (US); Ryan Kent, Portville, NY (US)

(73) Assignee: WELCH ALLYN, INC., Skaneateles Falls, NY (US)

( * ) Notice: Subject to any disclaimer, the term of this patent is extended or adjusted under 35 U.S.C. 154(b) by 522 days.

(21) Appl. No.: 16/948,619

(22) Filed: Sep. 25, 2020

(65) Prior Publication Data

US 2021/0096032 A1    Apr. 1, 2021

Related U.S. Application Data

(60) Provisional application No. 62/907,404, filed on Sep. 27, 2019.

(51) Int. Cl.
| | |
|---|---|
| *G01K 9/00* | (2006.01) |
| *G01K 1/20* | (2006.01) |
| *G01K 3/10* | (2006.01) |
| *G01K 13/20* | (2021.01) |
| *G01K 15/00* | (2006.01) |

(52) U.S. Cl.
CPC ............... *G01K 1/20* (2013.01); *G01K 3/10* (2013.01); *G01K 13/223* (2021.01); *G01K 15/005* (2013.01)

(58) Field of Classification Search
CPC .......... G01K 1/20; G01K 3/10; G01K 13/223; G01K 15/005; G01J 5/049; G01J 5/064; G01J 5/0011

See application file for complete search history.

(56) References Cited

U.S. PATENT DOCUMENTS

| | | | |
|---|---|---|---|
| 2014/0269833 A1* | 9/2014 | Durant | G01K 1/028 374/170 |
| 2016/0018273 A1* | 1/2016 | Jordan | G01K 7/015 702/130 |
| 2017/0035302 A1* | 2/2017 | Mullin | A61B 5/01 |
| 2018/0180485 A1* | 6/2018 | Macmillan | H04N 5/33 |

FOREIGN PATENT DOCUMENTS

WO    WO-2018147839 A1 *    8/2018    ......... B01D 46/0086

\* cited by examiner

*Primary Examiner* — Harshad R Patel
*Assistant Examiner* — Nasir U. Ahmed
(74) *Attorney, Agent, or Firm* — Lee & Hayes P.C.

(57) ABSTRACT

A method of determining a temperature of a patient includes measuring a first temperature of the patient with a temperature device, and measuring a second temperature of an environment with the temperature device. The method includes determining if a change in the ambient temperature exceeds a threshold. If the change does exceed the threshold, the method also includes applying a correction factor to the first temperature of the patient to account for the change in ambient temperature.

21 Claims, 8 Drawing Sheets

SYSTEMS AND METHODS FOR TEMPERATURE DETERMINATION

CROSS-REFERENCE TO RELATED APPLICATION(S)

This application is a non-provisional of and claims priority to Provisional Application No. 62/907,404 filed on Sep. 27, 2019 and entitled "System and Method for Temperature Determination," the entirety of which is incorporated herein by reference.

FIELD OF THE INVENTION

The present disclosure relates to systems and methods for temperature determination and, in particular, to systems and methods for determining patient temperature based at least partly on changes in ambient temperature.

BACKGROUND OF THE INVENTION

Temperature is an important vital sign in patient evaluation. Physicians commonly use a variety of methods for determining patient temperature including, for example, obtaining temperature measurements with a thermometer. While thermometers utilizing mercury have been in existence for many years, modern thermometers typically employ one or more electronic sensors configured to measure patient temperature. Such sensors may take one or more measurements over a relatively short period of time. Based on these measurements, the thermometer may generate an estimated internal and/or core temperature of the patient. In generating this estimated core temperature, it is common practice to insert at least a portion of the thermometer into a disposable cover prior to taking temperature measurements. The cover may overlay the electronic temperature sensor of the thermometer, and may protect the sensor from contamination during use.

Determining core temperature in this way, however, can lead to inaccurate measurements in certain situations. For example, in some situations the thermometer may be stored in an environment having an ambient temperature that fluctuates rapidly. Such rapid ambient temperature changes may affect the temperature of the thermometer itself and, thus, may reduce the accuracy of the temperature measurements made by the thermometer. Moreover, repeated use of the thermometer in a relatively short period of time may also affect the temperature of the thermometer, and may thereby hinder the accuracy of the resulting temperature measurements. While existing thermometers may utilize one or more heating components in an effort to stabilize the temperature of the thermometer prior to and/or during temperature measurement procedures, the use of such heating components has not proven to be a reliable solution for maximizing the accuracy of the temperature determinations made by such devices.

The example embodiments of the present disclosure are directed toward overcoming the deficiencies described above.

SUMMARY

In an example embodiment of the present disclosure, a method for determining a core temperature of a patient includes sensing, by a first sensing element, an ambient temperature of an environment over a first time period. The method may also include sensing, by a second sensing element, a patient temperature over a second time period, where the first time period and the second time period at least partially overlap. The method includes determining a first rate of change of the ambient temperature over the first time period, and determining a second rate of change of the patient temperature over the second time period. Additionally, the method includes determining that the first rate of change exceeds a threshold rate of change, and selecting a correction factor based at least in part on determining that the first rate of change exceeds the threshold rate of change. The method also includes determining the core temperature of the patient based at least in part on applying the correction factor to the second rate of change of the patient temperature.

In another example embodiment of the present disclosure, a temperature measurement system includes a first sensing element configured to sense an ambient temperature of an environment over a first time period, and a second sensing element configured to sense a patient temperature of a patient over a second time period. The temperature measurement system may also include a controller in communication with the first sensing element and the second sensing element, where the controller is configured to determine a first rate of change of the ambient temperature over the first time period. The controller may also determine a second rate of change of the patient temperature over the second time period, where the first time period and the second time period at least partially overlap. The controller may determine that the first rate of change exceeds a threshold rate of change, and select a correction factor based at least in part on determining that the first rate of change exceeds the threshold rate of change. The controller may also determine a core temperature of the patient based at least in part on applying the correction factor to the second rate of change of the patient temperature.

In a further example embodiment of the present disclosure, a method of manufacturing a temperature measurement device includes providing a first sensing element configured to detect an ambient temperature of an environment, and providing a second sensing element configured to detect a patient temperature of a patient. The method of manufacturing the temperature measurement device may include associating a controller with at least one of the first sensing element and the second sensing element. The method of manufacturing the temperature measurement device may also include programming the controller to determine a core temperature of the patient based on determining a first rate of change of the ambient temperature over a first time period, and determine a second rate of change of the patient temperature over a second time period that at least partially overlaps the first time period. The controller may also be programmed to determine that the first rate of change exceeds a threshold rate of change, select a correction factor based at least in part on determining that the first rate of change exceeds the threshold rate of change, and determine the core temperature of the patient based at least in part on applying the correction factor to the second rate of change of the patient temperature.

DETAILED DESCRIPTION

Figure 1:
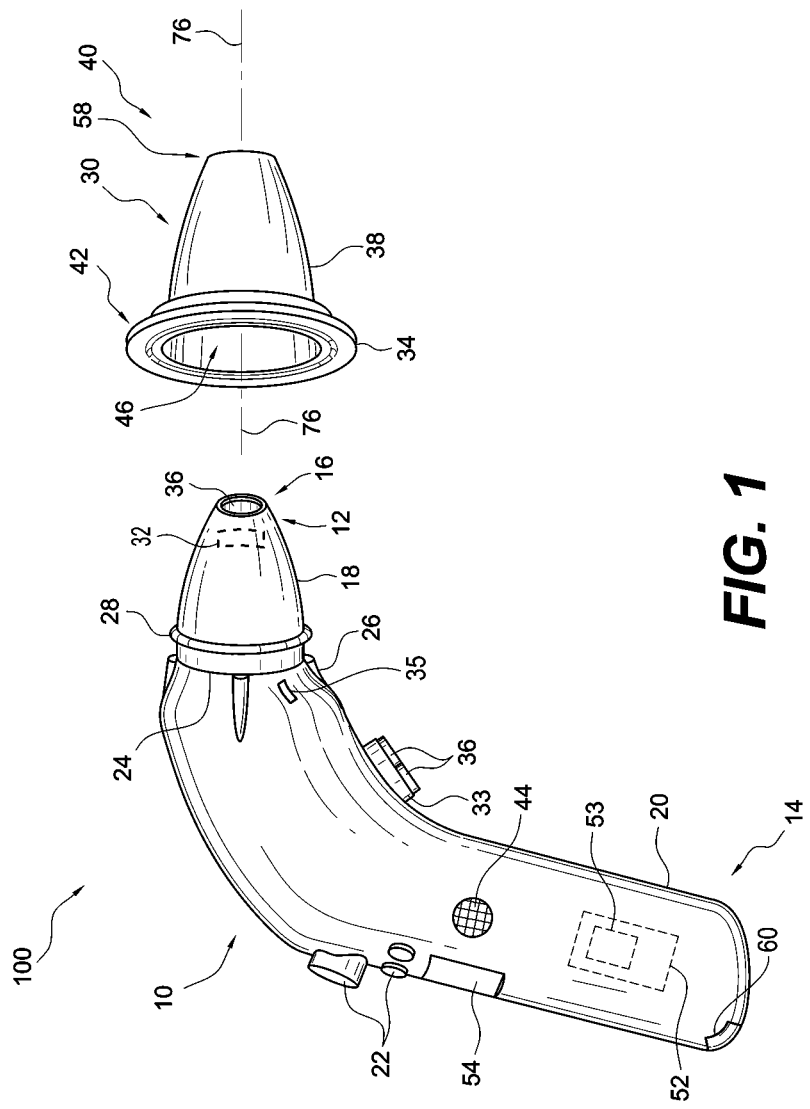
FIG. 1 illustrates a temperature measurement system according to an example embodiment of the present disclosure.

FIG. 1 illustrates a first example temperature measurement system 100 of the present disclosure including a temperature device 10 and a corresponding probe cover 30. It is understood that the depiction of the temperature device 10 (e.g., a temperature device for use in taking one or more measurements associated with the inner ear of a patient) is merely exemplary. In additional embodiments, the concepts described herein may be applicable to any other medical device that may use a cover, sheath, and/or other structure to protect the device from contaminants present on a surface or in a cavity of the body. Such medical devices may include, for example, probes, endoscopes, speculums, and/or other like devices where the characteristics of the cover, sheath, and/or other like structures impact the accuracy or precision of data gathered or measurements taken by the medical device.

As shown in FIG. 1, the temperature device 10 of example system 100 may include, for example, a head 18 connected to a handle 20. The head 18 may define a distal end 12 of the temperature device 10, and the handle 20 may define a proximal end 14 of the device 10. The head 18 may include an atraumatic tip 16 disposed at the distal end 12. The tip 16 may be sufficiently rounded and/or otherwise configured so as not to cause injury to a patient upon contact with a body surface or at least partial insertion of the head 18 within one or more body cavities of the patient. In an example embodiment in which the temperature device 10 is utilized to measure, calculate, estimate, and/or otherwise determine a temperature of the patient (e.g., a core temperature), it is understood that such body cavities may include the ear, oral cavity, rectal cavity, axilla area, and/or other known body cavities from which temperature may be sensed. Collectively, such body cavities and/or body surfaces may be referred to herein as "patient measurement sites." In further example embodiments, such patient measurement sites may also include a forehead of the patient and/or any other known or easily accessible outer surface of the patient. Such outer surfaces may include the patient's skin or eyes. For instance, a patient measurement site may include an inner canthus and/or an outer canthus of a patient's eye. Additionally, as discussed in more detail below in relation to FIG. 3, examples are considered in which the temperature device 10 measures, calculates, estimates, and/or otherwise determines a temperature of the patient without contacting the patient, such as by measuring thermal radiation emitted by the patient with an infrared sensor.

The head 18 and/or the handle 20 may be made from any material and/or combinations of materials commonly used in medical and/or examination procedures. Such materials may include, for example, plastics, polymers, composites, stainless steel, alloys, and/or any other like materials. Such materials may be suitable for repeated use and/or repeated sanitation. Accordingly, in an example embodiment of the present disclosure, the temperature device 10 and/or its components may be substantially waterproof. One or more waterproof seals may be included and/or otherwise utilized with components of the temperature device 10 to facilitate such repeated sanitation and/or use.

Alternatively, in some example embodiment (not shown) the temperature device 10 may include, for example, a shaft extending from the handle 20. In such embodiments, the atraumatic tip 16 may be disposed at a distal end of the shaft, and the tip may be sufficiently rounded and/or otherwise configured so as not to cause injury to a patient upon contact with and/or at least partial insertion of the shaft within one or more of the patient measurement sites (e.g., the oral cavity, the rectal cavity, etc.) described herein.

With continued reference to FIG. 1, the handle 20 may include one or more operator interfaces 22. Such operator interfaces 22 may be configured to assist in performing one or more functions of the temperature device 10. For example, the operator interfaces 22 may comprise any combination of switches, buttons, levers, knobs, dials, keys, and/or other like components configured to activate, deactivate, manipulate, and/or otherwise control components of the temperature device 10. Such operator interfaces 22 may, for example, assist the user in toggling through and/or selecting one or more modes of operation of the temperature device 10, enabling and/or disabling one or more sensors, alarms, and/or signals associated with operation of the device 10, initiating a single substantially instantaneous temperature determination, initiating a substantially continuous and/or repeating temperature determination, and/or other like modes, functions, or operations.

In the example embodiment shown in FIG. 1, at least one of the operator interfaces 22 may be operably connected to an ejector mechanism 26 disposed proximate a base 24 of the head 18. At least a portion of the temperature device 10 may be inserted into the probe cover 30 before and/or during use, and such an ejector mechanism 26 may be configured to assist in removing the probe cover 30 from the temperature device 10. For example, the ejector mechanism 26 may comprise one or more extensions, flanges, clamps, hooks, shoulders, arms, tabs, rings, and/or other like structures configured to assist in ejecting the probe cover 30 from the base 24 of the head 18 after use. In an example embodiment, one or more such ejector mechanisms 26 may be movable with respect to the base 24 and/or the head 18. In such example embodiments, the ejector mechanisms 26 may be movable in, for example, a path substantially parallel to the head 18. In additional example embodiments, the ejector mechanisms 26 may be movable in an arcuate path relative to the head 18. Movement of the ejector mechanisms 26 may assist in bending, flexing, and/or otherwise deforming at least a portion of the probe cover 30. For example, the ejector mechanisms 26 may be movable along one or more camming surfaces and/or other like external surfaces of the probe cover 30, and such movement may assist in flexing at least a portion of the probe cover 30.

Such flexing may ultimately overcome a retention force provided by one or more retention components 28 of the temperature device 10 and/or by one or more corresponding retention components of the probe cover 30, thereby releasing the probe cover 30 from the temperature device 10. For example, as shown in FIG. 1, a typical retention component 28 of the temperature device 10 may include a raised ring, flange, shoulder, and/or other like structure. Such a retention component 28 may extend partially or completely around, for example, a proximal portion of the head 18, and in example embodiments, one or more such retention components 28 may be disposed about the head 18. Regardless of its form, such a retention component 28 may be configured to releasably mate with a corresponding retention component of the probe cover 30 to assist in releasably coupling the probe cover 30 to the temperature device 10.

In example embodiments, one or more of the operator interfaces 22 may be operably connected to at least one sensor 32 of the temperature device 10. In some examples, the sensor 32 may be embedded within and/or otherwise formed integrally with the head 18 and/or the handle 20. In such example embodiments, it is understood that the sensor 32 may be electrically, operably, and/or otherwise connected to the operator interfaces 22 and/or other components of the temperature device 10 via known electrical connections. Additionally or alternatively, one or more components of the sensor 32 may be embedded within, disposed on or disposed proximate at an outer surface/external surface of the head 18 and/or of the tip 16. As will be described in greater detail below, in each of the example embodiments disclosed herein, the sensor 32 may be operably, controllably, electrically, and/or otherwise connected to a controller 52 disposed internal or external to the temperature device 10. In such an example embodiment, the controller 52 may be configured to assist in estimating, calculating, and/or otherwise determining a temperature of a patient based at least partly on signals and/or other inputs from one or more of the sensors (e.g., the at least one sensor 32) described herein.

In an example embodiment, the sensor 32 may be configured to sense one or more vital signs or physical characteristics of a patient such as, for example, temperature, blood pressure, heart rate, blood oxygen concentration, and/or other parameters. In an example embodiment, the sensor 32 may comprise a temperature sensor, such as a thermopile, thermocouple, thermistor, and/or other device configured to sense, measure, detect, and/or otherwise determine a temperature associated with the patient. For example, such a sensor 32 may be configured to sense a temperature of the patient measurement site into which a portion of the temperature device 10 has been inserted and/or with which the temperature device 10 has otherwise been placed in contact. It is understood that in example embodiments, measuring a temperature of the patient by contacting a patient measurement site with the temperature device 10 may include contacting the patient measurement site with the temperature device 10 while a probe cover 30 is disposed on the head 18 or shaft thereof. In such example embodiments, contact between the temperature device 10 and the patient measurement site may include contact between the probe cover 30 and the patient measurement site. For example, in embodiments in which the patient measurement site comprises the patient's ear, a portion of the head 18 of the temperature device 10 shown in FIG. 1 may be inserted into the ear such that a temperature associated with, for example, the tympanic membrane of the patient may be determined. In such embodiments, a probe cover 30 of the temperature device 10 may actually contact the ear and/or portions of the ear canal while the sensor 32 measures the temperature associated with the tympanic membrane. Alternatively, in embodiments in which the patient measurement site comprises the patient's oral cavity, a portion of a shaft of the temperature device 10 may be inserted into the patient's mouth such that a temperature measurement may be taken. In such embodiments, a probe cover 30 of the temperature device 10 may actually contact a surface of the mouth beneath the tongue, and/or other portions of the oral cavity, while the sensor 32 measures an associated temperature.

In example embodiments, the sensor 32 may comprise an infrared temperature sensor such as, for example, a thermopile and/or other like infrared-based temperature sensing components. Such a sensor 32 may be configured to convert thermal energy into electrical energy, and may comprise two or more thermocouples connected in series or in parallel. Such components may be configured to generate an output voltage proportional to a local temperature difference and/or temperature gradient. In an example embodiment in which the sensor 32 comprises at least one thermopile, the temperature device 10 may comprise, for example, an infrared temperature probe and/or other like infrared thermometer. In such embodiments, the sensor 32 may be configured to receive and/or emit radiation 62 (FIG. 2), such as thermal and/or infrared radiation. For example, the sensor 32 may be configured to sense, detect, collect, and/or otherwise receive radiation 62 emitted by the patient. Such radiation 62 may be emitted by, for example, the tympanic membrane and/or any of the patient measurement sites described herein. In such embodiments, the sensor 32 may be configured to collect the radiation 62, and to send a signal to the controller 52 indicative of the collected radiation 62. The controller 52 may utilize the received signal for any number of functions. For example, the controller 52 may be configured to estimate, infer, calculate, and/or otherwise determine a temperature of the patient (e.g., a core temperature) based at least in part on the signal and/or one or more additional inputs.

The sensor 32 may be configured to collect radiation 62 that is reflected, reemitted, and/or otherwise returned to the sensor 32. For example, at least a portion of such radiation 62 may reflect off of the tympanic membrane and/or may be absorbed and reemitted by the membrane. In such embodiments, the sensor 32 may be configured to collect the reflected and/or reemitted radiation 62, and to send a signal to the controller 52 indicative of the collected radiation 62.

The temperature device 10 may additionally include at least one window, lens, and/or other like optical component 36 positioned proximate the sensor 32. For example, such an optical component 36 may be disposed substantially flush and/or coplanar with the outer surface of the head 18. Such optical components 36 may be disposed, for example, at the tip 16 of the temperature device 10, and may be configured to assist in, for example, focusing, directing, and/or otherwise transmitting radiation 62 to the sensor 32 for collection. In additional example embodiments, such optical components 36 may assist in focusing, directing, and/or otherwise transmitting radiation 62 emitted by the sensor 32. Such optical components 36 may also assist in protecting the thermopile, thermocouple, thermistor, and/or other sensor components during use of the temperature device 10, and may assist in forming a substantially fluid tight compartment 82 (FIG. 2) within the head 18 to protect sensor components from contact with bodily fluids, cleaning solutions, and/or other liquids. It is understood that such optical components 36 may be substantially transparent to assist in the transmission of infrared and/or other types of radiation 62. In example embodiments, the optical components 36 may comprise one or more convergent, collimating, and/or divergent lenses.

In example embodiments, the temperature device 10 may include one or more additional sensors configured to assist in determining one or more physical characteristics of the patient. In an example embodiment, at least one such sensor 33 may be the same type of sensor described above with respect to sensor 32. For example, the sensor 33 may comprise any type of sensor, such as a thermocouple and/or thermistor, configured to sense a temperature associated with the patient. In an additional example embodiment, the sensor 33 may comprise an infrared temperature sensor such as, for example, a thermopile and/or other like infrared-based sensor. In still further embodiments, the sensor 33 may comprise an array of pixels and/or other like sensing elements configured to determine a temperature of the patient. In example embodiments, an array of sensing elements included in the sensor 33 may include one or more such sensing elements configured to sense a temperature of an outer surface of a patient. Such outer surfaces may include, for example, a skin surface such as the face, an eye, and/or any other like outer body surface of the patient. Such sensors 33 may be configured to determine a temperature of the outer surface without contacting the patient with the temperature device 10.

Relative movement between the temperature device 10 and the patient, such as movement of the temperature device 10 and/or the sensor 33 about, along, substantially parallel to, substantially perpendicular to, at an angle to, and/or otherwise relative to one or more of an axis corresponding to the patient, may assist in measuring the temperature of the outer surface from a plurality of different points, angles, locations, and/or positions. Various temperature measurements taken during such relative movement may assist the temperature device 10 in generating, for example, a three-dimensional temperature measurement of the patient. Such relative movement may also assist in measuring the temperature of more than one location on the outer surface. For example, in embodiments in which the outer surface comprises the patient's face, such locations may include the patient's forehead, eyes, nose, sinus region, temple, lips, and/or other anatomical structures or patient measurement sites found on the face. Multiple temperature measurements obtained by moving the array of sensing elements of sensor 33 relative to the outer surface may be directed to the controller 52. The controller 52 may use such measurements as inputs into one or more algorithms, control maps, and/or look-up tables to assist in generating, for example, the three-dimensional temperature measurement of the patient.

The sensor 33 may include any of the optical components 36 described above with respect to the sensor 32. For example, at least one window, lens, and/or other like optical component 36 may be positioned proximate the sensor 33, and may be configured to assist in, for example, focusing, directing, and/or otherwise transmitting radiation 62 to the sensor 33 for collection. Such optical components 36 may be substantially transparent to assist in the transmission of infrared and/or other types of radiation to the sensor 33, and in example embodiments, the optical components 36 may comprise one or more convergent, collimating, and/or divergent lenses. Such optical components 36 may be configured to assist in, for example, focusing one or more sensing elements of the sensor 33 on one or more respective locations associated with the outer surface of the patient. For example, the optical components 36 may be configured to focus sensing elements of a pixel array associated with the sensor 33 on a first location of the outer surface. The optical components 36 may also be configured to focus sensing elements of the pixel array on a second location of the outer surface. For example, if such an example outer surface comprises a face of the patient, the first location may include at least one of the patient's eyes while the second location may include the patient's forehead. By focusing, for example, an array of pixels and/or other sensing elements of the sensor 33 in this way, example embodiments of the temperature device 10 may be configured to use temperature measurements and/or other inputs corresponding to the locations on the outer surface that are brought within a field of view of the respective sensing elements.

In some examples, the temperature device 10 may also include one or more sensors 35, which may be configured to detect and/or otherwise determine an ambient temperature of an environment. The sensor 35 may comprise any type of sensor, such as a thermocouple and/or thermistor, configured to sense an ambient temperature associated with the environment. In an additional example embodiment, the sensor 35 may comprise an infrared temperature sensor such as, for example, a thermopile and/or other like infrared-based sensor. In still further embodiments, the sensor 35 may comprise an array of pixels and/or other like sensing elements configured to determine an ambient temperature of the environment.

In some examples, the sensor 35 may be configured to convert thermal energy into electrical energy, and may comprise two or more thermocouples connected in series or in parallel. Such components may be configured to generate an output voltage proportional to a local temperature difference and/or temperature gradient. In an example embodiment in which the sensor 35 comprises at least one thermopile, the temperature device 10 may comprise, for example, an infrared thermometer. In such embodiments, the sensor 35 may be configured to receive and/or emit radiation 62 (FIG. 2), such as thermal and/or infrared radiation. For example, the sensor 35 may be configured to sense, detect, collect, and/or otherwise receive radiation 62 emitted by various objects the environment. In such embodiments, the sensor 35 may be configured to collect the radiation 62, and to send a signal to the controller 52 indicative of the collected radiation 62. The controller 52 may utilize the received signal for any number of functions. For example, the controller 52 may be configured to estimate, infer, calculate, and/or otherwise determine a temperature of the environment based at least in part on the signal and/or one or more additional inputs.

In some cases, the temperature device 10 may include a thermoelectric cooling component (not explicitly pictured) to transfer heat away from components of the temperature device 10 (e.g., the controller 52, the sensor 35, etc.), and/or to reduce a temperature of the temperature device 10 itself. The thermoelectric cooling component may comprise a Peltier cooler, solid state refrigerator, thermoelectric cooler, or other type of cooling device or system. In examples, the controller 52 may determine that a temperature of the temperature device 10 exceeds a threshold temperature (e.g., 80 degrees Fahrenheit, 85 degrees Fahrenheit, etc.), and/or may determine a number of times that the temperature device 10 has been used within a threshold time period (e.g., 2 minutes, 5 minutes, 10 minutes, 1 hour, etc.). If the temperature of the device exceeds the threshold temperature and/or the number of times that the temperature device 10 has been used within the time period exceeds a threshold number of uses (e.g., 10 uses in 2 minutes), the controller 52 may activate the thermoelectric cooling component. The thermoelectric cooling component, once activated, may cool the temperature device 10 to prevent the heat generated by the components of the temperature device 10 from affecting the temperature readings of patients. In this way, accuracy of temperature readings of patients when taken in rapid succession are less likely to be affected by the heat generated by components of the temperature device 10.

Additionally, the controller 52 may be configured to account for different ambient temperature settings that would otherwise result in an inaccurate core temperature calculation. For example, the controller 52 may be configured to determine a rate of change of an ambient temperature of the environment over a first time period (e.g., 0.5 second, 1 second, 2 seconds, 3 seconds, etc.). In some cases, the first time period during which the controller 52 determines the ambient temperature may be at least partially prior to the temperature measurement device 10 calculating a core temperature of the patient, such as before the operator interface 22 receives an indication from a user to initiate temperature measurement. The controller 52 may also determine a second rate of change of the patient temperature over a second time period that at least partially overlaps with the first time period during which the ambient temperature is determined. The rate of change of the patient temperature is described above and below.

The controller 52 may determine that the first rate of change corresponding to the ambient temperature exceeds a threshold rate of change. In but one example, the controller 52 may use a threshold rate of change of +/−1 degree every 0.5 seconds, although any suitable threshold may be used. Based on the controller 52 determining that the rate of change of the ambient temperature is greater than the threshold rate of change, the controller 52 may select a correction factor to apply to the patient temperature measured by the sensor(s) 32, 33.

For example, if the rate of change of the ambient temperature is greater than 1 degree every 0.5 seconds, the controller 52 may apply a correction according to $y=mx+b$ (e.g., by employing a first order curve fitting), where y corresponds to a corrected temperature, m corresponds to a threshold change in temperature over a period of time (e.g., greater than 1 degree every 0.5 seconds, although any suitable threshold change in temperature may be used), x corresponds to the temperature reading of the thermopile at a particular time, and b corresponds to a threshold amount of offset between a measured ambient temperature and the temperature reading of the thermopile at substantially the same time (e.g., greater than 1.2 degrees offset between the ambient temperature and the temperature reading of the thermopile, although any suitable threshold offset in temperature may be used). Alternatively or additionally, the controller 52 may use second order and/or third order curve fittings to determine a corrected temperature. In some examples, the controller 52 may use a machine learning algorithm, such as a linear regression model, to determine coefficients (e.g., thresholds) to be used in the first order, second order, and/or third order curve fittings.

In examples, if the rate of change of the ambient temperature is less than −1 degree every 0.5 seconds, the controller 52 may apply a correction similar to the correction applied when the rate of change is greater than 1 degree every 0.5 seconds, although the controller 52 may use different coefficients (e.g., different magnitude and/or different +/− sign). For instance, the controller 52 may apply the correction according to $y=mx+b$ as above, using same or different coefficients. Again, the controller 52 may determine coefficients in this example (if the rate of change of the ambient temperature is less than −1 degree every 0.5 seconds) using a machine learning algorithm such as a linear regression model. However, if the rate of change of the ambient temperature does not exceed the threshold rate of change (either positively or negatively), the controller 52 may determine a core temperature of the patient without applying a correction to the temperature measured by the sensor(s) 32, 33.

The sensor 35 may be located on an exterior and/or interior of the temperature device 10, at a location where an ambient temperature of the environment may be collected that is unlikely to be affected by proximity of the patient being measured by the sensors 32, 33, and/or affected by a hand of a person holding the handle 20 of the temperature device 10. As such, the sensor 35 may be positioned away from the handle 20, and/or away from the head 18 of the temperature measurement device 10. The position of the sensor 35 depicted in the example temperature measurement system 100 is intended only as one example position, and other positions of the sensor 35 are also considered, such as proximate the imaging device 60 on a base of the handle 20, proximate the operator interfaces 22, separate from the temperature measurement device 10 (e.g., as part of another device communicatively coupled to the temperature measurement device 10), and so forth.

In further example embodiments, the temperature device 10 may include one or more additional components such as, for example, a camera or other like imaging device 60. Such imaging devices 60 may be configured to capture digital, thermal, and/or other like images of the patient. For example, the imaging device 60 may comprise a digital camera operably connected to the controller 52 and configured to capture an image of the outer surface and/or other portions of the patient. Alternatively, and/or in addition, the imaging device 60 may be configured to collect thermal, infrared, and/or other radiation 62 emitted by the patient, and to form a thermal image of the patient using and/or based on the collected radiation 62. In such example embodiments, the imaging device 60 may be configured to form a thermal image of the patient independently or in combination with the sensing elements of the sensor 33.

In further example embodiments, the controller 52 may include components such as an image processor 53 configured to receive signals and/or other inputs from the imaging device 60. The image processor 53 may be configured to assist in forming an image of the patient based on such inputs. For example, in embodiments in which the imaging device 60 comprises a digital camera, the image processor 53 may receive signals and/or other inputs from the imaging device 60, and may assist in forming a visual image of the patient based on such inputs. Such a visual image may be illustrated on a display 54 of the temperature device 10.

Alternatively, in embodiments in which the imaging device 60 is configured to collect thermal, infrared, and/or other radiation 62 emitted by the patient, the image processor 53 may receive signals and/or other inputs from the imaging device 60 indicative of such collected radiation 62. In such embodiments, the image processor 53 may assist in forming a thermal image of the patient based on such inputs. As mentioned above, the thermal image may be illustrated on the display 54, and such a thermal image may comprise a two or three-dimensional image, temperature gradient, and/or temperature profile of the patient.

In example embodiments the temperature device 10 may further include one or more signal devices 44 operably connected to the controller 52, the sensors 32, 33, and/or the ambient sensor 35. Such signal devices 44 may include, for example, one or more lights, LEDs, speakers, and/or other like devices configured to emit an audible and/or optical alarm or signal in response to a command or signal from the controller 52. Such an alarm or other signal may be initiated by, for example, the controller 52 when a temperature determined by the temperature device 10 meets or exceeds a threshold temperature. In additional example embodiments, such an alarm or signal may be initiated during a substantially continuous temperature calculation operation where the rate of patient temperature change meets or exceeds a predetermined temperature change rate threshold. In example embodiments, the signal device 44 may output an alarm or other signal indicating that the temperature device 10 and/or the sensor 33 is disposed outside of the preferred proximity range of the sensor 33. The signal device 44 may also be configured to output a signal indicating when the temperature device 10 and/or the sensor 33 has been positioned within the preferred proximity range.

As discussed above, the temperature device 10 may include one or more displays 54. An example display 54 may be operably connected to the controller 52 and/or to the image processor 53. The display 54 may comprise, for example, a liquid crystal display (LCD) screen, a light emitting diode (LED) display, a digital read-out, an interactive touch-screen, and/or any other like components configured to communicate information to the user or control the temperature device 10. Such displays 54 may be configured to indicate, for example, one or more temperatures determined by the sensors 32, 33, and/or 35, one or more temperatures determined based on signals received from the sensors 32, 33, and/or 35, and/or any other information that may be useful during operation of the temperature device 10. The display 54 may also be configured to communicate information indicative of additional physical characteristics of the patient including but not limited to disease state, injury, and emotional state. The display 54 may be configured to communicate such information substantially instantaneously and/or substantially continuously depending on the mode of operation of the temperature device 10. Such a display 54 may also indicate whether or not the temperature device 10 is turned on, and whether a probe cover 30 has been connected to the temperature device 10.

In additional example embodiments, the temperature device 10 may include one or more transmitters, receivers, transceivers and/or other like communication devices (not shown) configured to send information to and/or receive information from a remote device and/or source. In such example embodiments, the temperature device 10 may be configured to send and/or receive any of the information described herein with regard to the display 54, sensors 32, 33, and/or 35, and/or other components of the temperature device 10 via such communication devices. In such embodiments, a communication device of the temperature device 10 may be configured to send and/or receive such information to a remote device and/or source wirelessly via BLUETOOTH®, WIFI®, or other like means. Such a communication device may be disposed at any convenient location on the temperature device 10, and in additional embodiments, such a communication device may be disposed partially and/or completely internal to the temperature device 10.

In still further example embodiments, the display 54 may be configured to communicate information indicative of whether one or more threshold temperatures, threshold temperature change rates, and/or other sensed metric thresholds have been met or exceeded. The display 54 may be configured to display any other typical operating information such as, for example, a temperature vs. time trend line or other graphical depictions.

The controller 52 may be operably connected to the operator interfaces 22, display 54, sensors 32, 33, 35, imaging device 60, and/or other components of the temperature device 10, and the controller 52 may be configured to control the operation of such components. In an example embodiment, the controller 52 may be configured to receive signals, information, measurements, and/or other data from the sensors 32, 33, 35 of the temperature device 10, and to determine a temperature value indicative of a core temperature of the patient based on the information received. The controller 52 may also be programmed and/or otherwise configured to execute one or more commands and/or control programs. In addition to the image processor 53 described above, the controller 52 may comprise memory, additional processors (e.g., a microprocessor or other components generally associated with or included in a computer, a tablet, a mobile phone, or other computing device), and/or other known controller components to facilitate the functionality described herein. In an example embodiment, the controller 52 may be disposed within, for example, the handle 20 of the temperature device 10. In such an embodiment, the handle 20 may form one or more substantially water-tight and/or substantially hermetically sealed compartments for storing the various components of the controller 52.

In example embodiments, the probe cover 30 may include a body 38 having a distal end 40, a proximal end 42, and a substantially atraumatic tip 58 disposed at the distal end 40. As shown in FIG. 1, in example embodiments the probe cover 30 may also include an annular flange 34 disposed at the proximal end 42. The body 38 may be substantially conical, substantially cylindrical, and/or any other suitable shape, and in example embodiments, the body 38 may be similar in shape, size, and/or dimensions to the head 18. For example, the probe cover 30 may be hollow, and the body 38 may be incrementally longer than the head 18 so as to fit over substantially the entire head 18. When mounted on the temperature device 10 shown in FIG. 1, the probe cover 30 may overlay the sensor 32 disposed at the tip 16 of the head 18. The probe cover 30 may define an orifice 46 at the proximal end 42 thereof. The probe cover 30 may have a longitudinal axis 76 extending centrally through the body 38 and the tip 58, and when the probe cover 30 is connected to the temperature device 10 shown in FIG. 1, the longitudinal axis 76 may be substantially collinear with, for example, a central and/or longitudinal axis (not shown) of the sensor 32.

The probe covers 30 described herein may be formed from any medically approved material known in the art. Such materials may include, for example, plastics, polymers, and/or any of the other materials discussed above with regard to the temperature device 10. Using such materials may enable, for example, the probe cover 30 to be repeatedly used and/or sanitized. Such materials may also facilitate formation of the probe cover 30 through any molding, extrusion, and/or other like process known in the art. Such materials and/or processes may enable the probe cover 30 to be formed with any desirable transmissivity, thickness, dimensions, and/or other configurations.

The example temperature measurement systems 100, 200, and 300 described herein may be utilized by physicians, nurses, health care professionals, and/or other users in a variety of different environments. For example, the temperature devices 10 and/or temperature measurement systems 100, 200, or 300 described herein may be employed in any of a number of examination facilities to determine one or more temperatures associated with a patient such as, for example, an estimated core temperature of the patient. Such an estimated core temperature may be utilized by the health care professional to assist in treating the patient, and may have a variety of uses that are well known in the medical field.

The example temperature measurement systems 100, 200, or 300 may be utilized to determine patient temperature in a variety of different ways. For example, the temperature devices 10 disclosed herein may be configured to determine patient temperature using one or more contact-based methods of temperature determination. In such contact-based methods, a "contact" mode of the temperature device 10 may be selected using one or more of the operator interfaces 22 described herein. Additionally, a user of the temperature device 10 may insert at least a portion of the temperature device 10 into a corresponding probe cover 30. The user may insert at least a portion of, for example, the head 18 into the probe cover 30, via the orifice 46. In an example embodiment, the probe cover 30 may be disposed within a box or other like storage container (not shown) while the head 18 of the temperature device 10 is inserted into the probe cover 30. In such an example embodiment, the probe cover 30 may be accessed through an opening of the storage container for insertion of the head 18.

As one or more of the retention components 28 of the temperature device 10 comes into contact with the probe cover 30, the retention components 28 may hook, clip, and/or otherwise mate with the proximal end 42 of the probe cover 30 to assist in retaining the probe cover 30. In example embodiments in which the proximal end 42 of the probe cover 30 defines one or more of the notches, cutouts, and/or other concave retention components described above, these retention components may mate with the corresponding retention components 28 of the temperature device 10 to assist in retaining the probe cover 30 thereon.

Once the probe cover 30 has been mounted onto the temperature device 10, the probe cover 30 may be placed into contact with a patient measurement site to facilitate determining an estimated core temperature of the patient. For example, at least a portion of the probe cover 30 shown in FIG. 1 may be inserted into an ear canal of the patient such that the tip 58 is disposed proximate the tympanic membrane of the patient. The probe cover 30 and/or the sensor 32 may be positioned such that the probe cover 30 is in contact with the ear and/or ear canal, and the tympanic membrane is disposed at least partially within the field of view of the sensor 32. Alternatively, the probe cover 30 may be inserted into an axilla area, a rectal cavity, an oral cavity, and/or other like patient measurement site such that the tip 58 is disposed in contact with the measurement site.

Once the probe cover 30 has been placed in contact with the patient measurement site, the sensor 32 may be activated via the operator interfaces 22 to sense a temperature indicative of a temperature of the patient measurement site. For example, in an embodiment in which the sensor 32 comprises a thermocouple and/or a thermistor, the sensor 32 may be utilized to measure the temperature of the measurement site. Alternatively, in embodiments in which the sensor 32 comprises an infrared temperature sensor, the sensor 32 may detect radiation 62 emitted by the measurement site. For example, radiation 62 emitted by the tympanic membrane, oral cavity, axilla area, and/or rectal cavity may be directed to the sensor 32 for collection via the one or more optical components (not pictured). Signals indicative of the patient measurement site temperature may be sent to the controller 52 by the sensor 32, and while the temperature device is operating in the contact mode, the controller 52 may assist in estimating the core temperature based solely on this sensed temperature.

Figure 3:
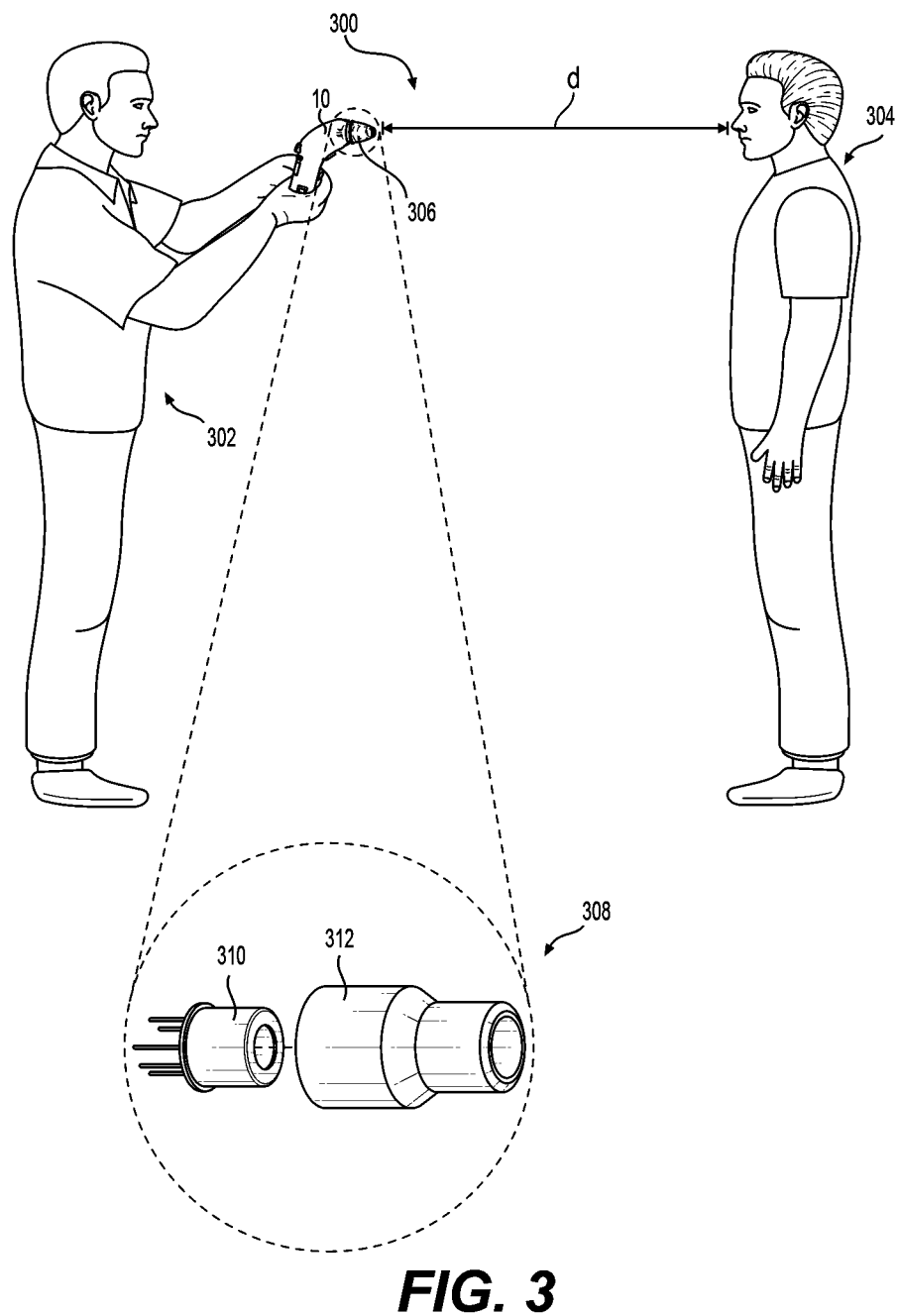
FIG. 3 illustrates an additional temperature measurement system for determining a temperature of a patient according to an example of the present disclosure.

In additional example embodiments, the temperature devices 10 disclosed herein may be configured to determine patient temperature and/or other physical characteristics of the patient using one or more noncontact-based methods of patient evaluation (FIG. 3). In such noncontact-based methods, a "noncontact" mode of the temperature device 10 may be selected using one or more of the operator interfaces 22 described herein. In such example noncontact modes of operation, the sensor 33 may be activated via the operator interfaces 22 to determine a temperature indicative of a temperature of the patient measurement site. For example, in an embodiment in which the sensor 33 comprises a thermocouple, a thermopile, and/or an infrared temperature sensor, the sensor 33 may detect radiation 62 emitted by the measurement site. For example, radiation 62 emitted by the forehead, eyes, sinus area, and/or other locations on the outer surface of the patient may be collected by the sensor 33. Such radiation may be directed to the sensor 33 for collection via the one or more optical components 36 associated with the sensor 33. Signals indicative of the patient measurement site temperature may be sent to the controller 52 by the sensor 33, and while the temperature device 10 is operating in the noncontact mode, the controller 52 may assist in estimating the core temperature based solely on this sensed noncontact-based temperature. Such noncontact-based methods of temperature determination may be useful in a variety of applications. Such applications may include initial and/or patient intake screening, and situations in which the patient is uncooperative. Such applications may also include situations in which temperature determination through traditional contact-based methods may place the user at an elevated risk of contact with, for example, germs, viruses, contagious disease, patient bodily fluids, and/or other like substances or contaminants.

In example embodiments in which the temperature device 10 is configured to determine patient temperature and/or other physical characteristics using a noncontact-based method of patient evaluation, one or more components of the temperature device 10 associated with contact-based methods of patient evaluation may be omitted. For example, in such embodiments the sensor 32 and corresponding optical components 36 may be omitted from the temperature device 10. Omission of such components may reduce the cost and complexity of the temperature device 10 and may be desirable in environments in which noncontact-based patient evaluation methods are adequate for the level of care required.

In further example embodiments, the temperature devices 10 disclosed herein may be configured to determine one or more physical characteristics of a patient, including but not limited to patient temperature, using a combination of a contact-based method of temperature determination and a noncontact-based method of temperature determination and/or patient evaluation. In such methods, a "combination" mode of the temperature device 10 may be selected using one or more of the operator interfaces 22 described herein. Such a combination mode may be useful to assist in determining a variety of physical characteristics of the patient based on one or more comparisons between contact-based and noncontact-based method of patient evaluation. Further, it is understood that the temperature devices 10 of the present disclosure may allow the user to select between the contact mode, noncontact mode, and combination mode of operation depending upon the requirements of each particular application and/or the condition or characteristics of the patient.

While operating in the combination mode, an example method of temperature determination may include determining one or more alignment parameters associated with the position of the temperature device 10 relative to the patient.

Such an alignment parameter may be determined using one or more of the sensors described herein, and the alignment parameter may be determined before, during, and/or shortly after determining the temperature indicative of the temperature of the measurement site with the sensor 33. In such embodiments, a temperature value indicative of the patient's core temperature may be determined based on the alignment parameter.

In still further example embodiments, the temperature device 10 of the present disclosure may include one or more ports, connectors, terminals, and/or other like connection devices configured to enable communication between the temperature device 10 and one or more separate devices. For example, in the noncontact-based embodiments described herein, the sensor 32 and corresponding optical components 36 may be omitted from the temperature device 10. In some embodiments, one or more components of the temperature device 10 may be disposable.

In additional example embodiments, the temperature devices 10 described herein may be capable of automatically configuring and/or reconfiguring themselves depending on the age, gender, and/or other physical characteristics of the patient. For example, such temperature devices 10 may be configured to make a noncontact-based determination of one or more physical characteristics of the patient. Such non-contact-based determinations may be made, for example, by the controller 52 in conjunction with the imaging device 60, sensor 33, and/or any other noncontact-based sensors of the temperature device 10. Such determinations may include, for example, capturing an image of the patient and, through one or more image recognition and/or image processing algorithms, determining an approximate age of the patient. Such images may include, for example, a visual image and/or a thermal image, and such algorithms may also be used to determine, for example, the gender of the patient. Once the gender and/or the approximate age of the patient has been determined, the temperature device 10 may automatically select an appropriate control configuration for future temperature determinations and/or other physical characteristic determinations. For example, if the temperature device 10 determines that the patient is an adult, the temperature device 10 may, in response to the determination, automatically utilize one or more core temperature determination algorithms and/or physical characteristic determination algorithms tailored toward treatment and/or diagnosis of adult patients. Alternatively, if the temperature device 10 determines that the patient is a pediatric patient, the temperature device 10 may, in response to the determination, automatically utilize one or more core temperature determination algorithms and/or physical characteristic determination algorithms tailored toward treatment and/or diagnosis of pediatric patients. A similar "tailored" algorithm and/or process may be employed by the temperature device 10 in response to the determination of patient gender.

Figure 2:
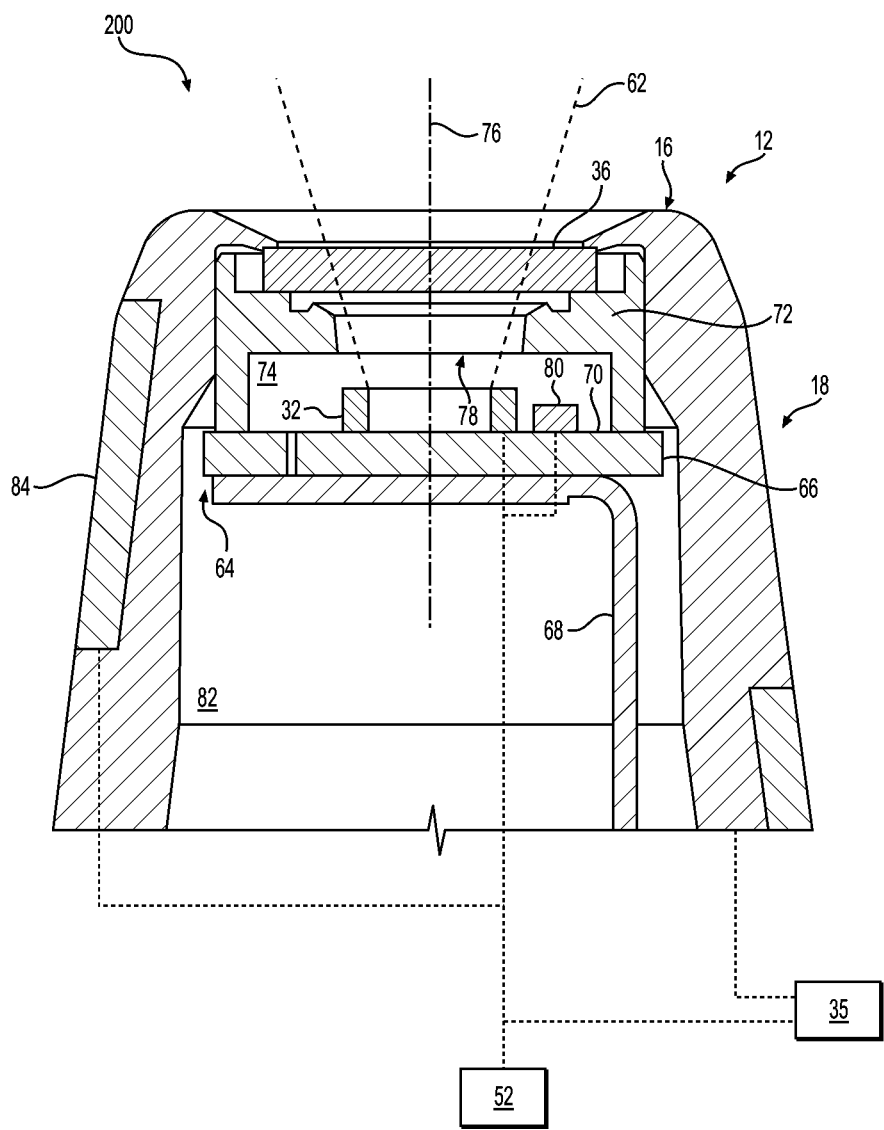
FIG. 2 illustrates a cross-sectional view of a portion of the temperature measurement system shown in FIG. 1.

FIG. 2 illustrates a cross-sectional view 200 of a portion of the temperature measurement system 100 shown in FIG. 1. For example, the cross-sectional view may correspond to at least a portion of the tip 16 of the head 18 of the temperature measurement device 10.

The cross-sectional view 200 depicts a sensor assembly 64, including a possible location of a sensor 84 configured to detect an ambient temperature of an environment before, during, and/or after a patient core temperature is measured by the temperature measurement device 10. In some examples, the sensor 84 may have similar functionality to the sensor 35 of FIG. 1. Additionally, the sensor 84 may be communicatively coupled to the controller 52 and/or the sensor 35, as shown. In some cases, the sensor 84 and the sensor 35 may both provide ambient temperature readings to the controller 52. While the sensor 35 is located on the handle 20 portion of the temperature measurement device 10, the sensor 84 may be located on the tip 16 of the temperature measurement device 10 to collect ambient temperature readings from an alternate location.

An internal housing 72 may provide structure inside of the tip 16 for the sensor assembly 64, such as to ensure that the sensor 32 is located at a proper distance from the optical component 36 to receive radiation 62 emitted by the patient. A first side 70 of a printed circuit board (PCB) 66 may connect to a rear side of the sensor 32, where the PCB 66 is also affixed on the first side 70 to the internal housing 72. A support 68 for the sensor assembly 64 may connect to a side of the PCB 66 opposite the first side 70 on which the sensor 32 is located. The support 68 may secure the sensor 32 at the proper distance from the optical component 36 to receive the radiation 62. An internal cavity 74 may include space to separate the optical component 36 from the sensor 32. The internal housing 72 surrounding the internal cavity 74, like the compartment 82, may protect sensor components from contact with bodily fluids, cleaning solutions, and/or other liquids or dust that may degrade the performance of the sensor components. The internal housing 72 may define an opening 78 through which the radiation 62 may pass from the optical component 36, through the internal cavity 74, to the sensor 32 to measure temperature of a patient, as described above. In some examples, sensor components 80 may include a driver, controller, processor, microprocessor, or other components to control the sensor 32. The sensor components 80 may be located on the first side 70 of the PCB 66 proximate the sensor 32, although other locations for the sensor components 80 are also considered.

FIG. 3 illustrates an additional example of a temperature measurement system 300. For instance, the temperature measurement system 300 may include the temperature measurement device 10 being operated by a user 302 in a non-contact mode. The user 302 may measure a temperature of a patient 304 using the temperature device 10 in the non-contact mode at a distance d from the patient. As shown, the temperature device 10 includes an infrared sensor assembly 306 configured to detect a temperature of the patient 304 at the distance d.

A magnified view 308 illustrates details of the infrared sensor assembly 306. For example, the infrared sensor assembly 306 may include a thermopile 310 and a cover 312 to ensure that the thermopile 310 is properly located within the temperature device 10, to insulate the thermopile 310, and so forth. The thermopile 310 may correspond to the sensor 33 described in relation to FIG. 1. In some examples, the thermopile 310 may comprise an infrared sensor as described above, and/or components such as an integrated signal processor to process infrared signals. A signal processor integrated with the thermopile 310 may be in communication with the controller 52, and process analog temperature signals into digital signals prior to communicating the digital signal to the controller 52. The controller 52 may receive the digital signals from the signal processor of the thermopile 310 and modify the signals to account for changes in ambient temperature, including changes in temperature of the temperature device 10, as described herein. As discussed above, the thermopile 310 may detect radiation emitted by the patient 306 and communicate a signal representative of the radiation to the controller 52, where the controller 52 then estimates the core temperature of the patient 306 based solely on this sensed noncontact-based temperature collection.

Figure 4:
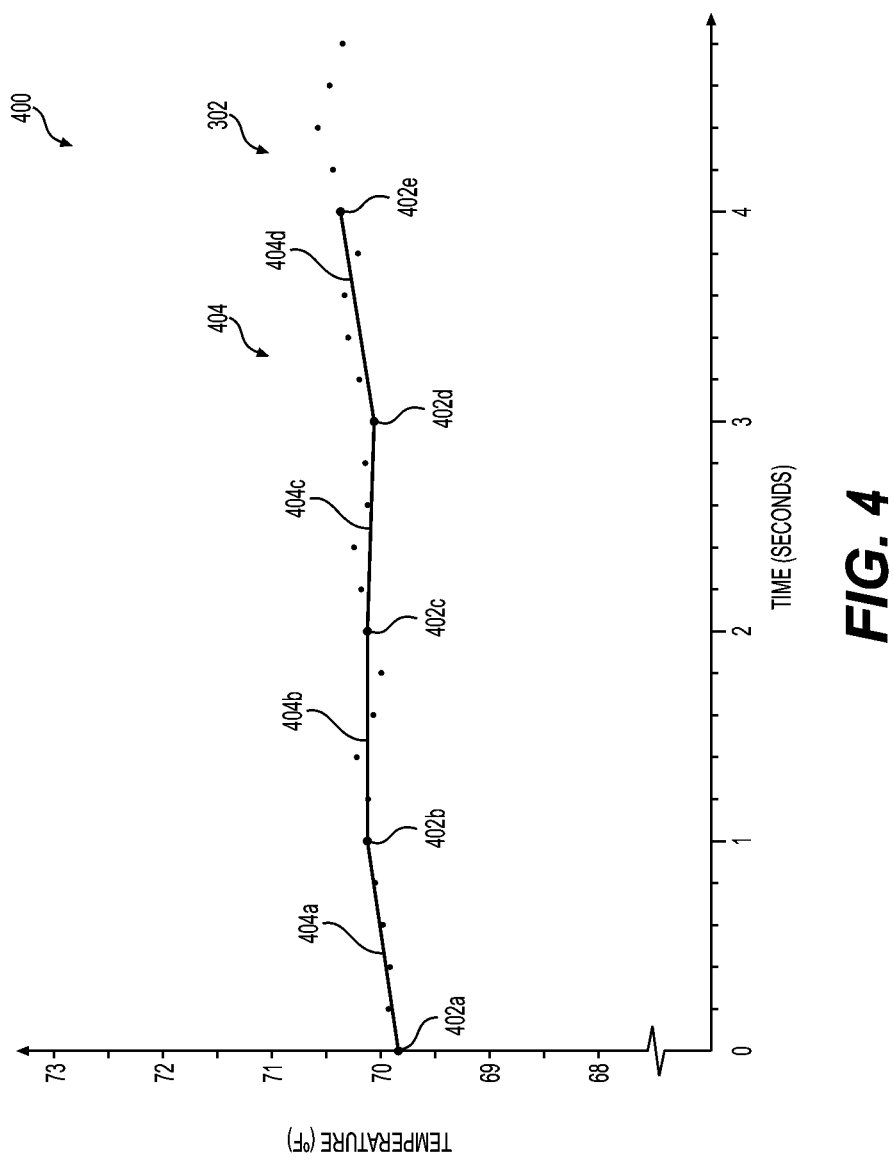
FIG. 4 is a graphical illustration of ambient temperature information according to an example embodiment of the present disclosure.

FIG. 4 is a graphical illustration 400 of ambient temperature information according to an example embodiment of the present disclosure. The graphical illustration 400 depicts a first temperature reading 402a, a second temperature reading 402b, a third temperature reading 402c, a fourth temperature reading 402d, and a fifth temperature reading 402e (collectively, temperature readings 402) that correspond to ambient temperature readings of an environment. In some examples, the temperature readings 402 may be measured by one or both of the sensors 35, 84 described in relation to FIGS. 1 and 2, and/or the thermopile 310 described in relation to FIG. 3. As noted above, the controller 52 may determine a change in ambient temperature over a time period, where the controller 52 may determine the change in ambient temperature based on a rate of change of temperature between a first time and a second time. The rate of change of the temperature, in some examples, may be represented by a slope of a line segment extending from a first temperature value at a first time, to a second temperature value at a second, later time. The controller 52 may determine a slope of the line segment by applying a linear best-fit curve between the first temperature value and the second temperature value.

In some cases, the controller 52 may apply the linear best-fit curve across temperature values collected at one or more times between the first temperature value and the second temperature value. In this example, the controller 52 may determine a first slope corresponding to a first line segment 404a between the first time 402a and the second time 402b, a second slope corresponding to a second line segment 404b between the second time 402b and the third time 402c, a third slope corresponding to a third line segment 404c between the third time 402c and the fourth time 402d, and/or a fourth slope corresponding to a fourth line segment 404d between the fourth time 402d and the fifth time 402e (collectively, line segments 404). The controller 52 may use a threshold value of +/−1 degree per second to determine whether to apply a correction factor to a patient temperature calculation (although any threshold value may be used, as described elsewhere herein). The controller 52 may determine, in this example, that none of the values corresponding to the slopes of the line segments 404 exceed a threshold value for change in temperature over the time period (in this case, one second). Therefore, the controller 52 may not apply a correction to the patient temperature measured by the sensor(s) 32, 33 to account for a change in ambient temperature.

Figure 5:
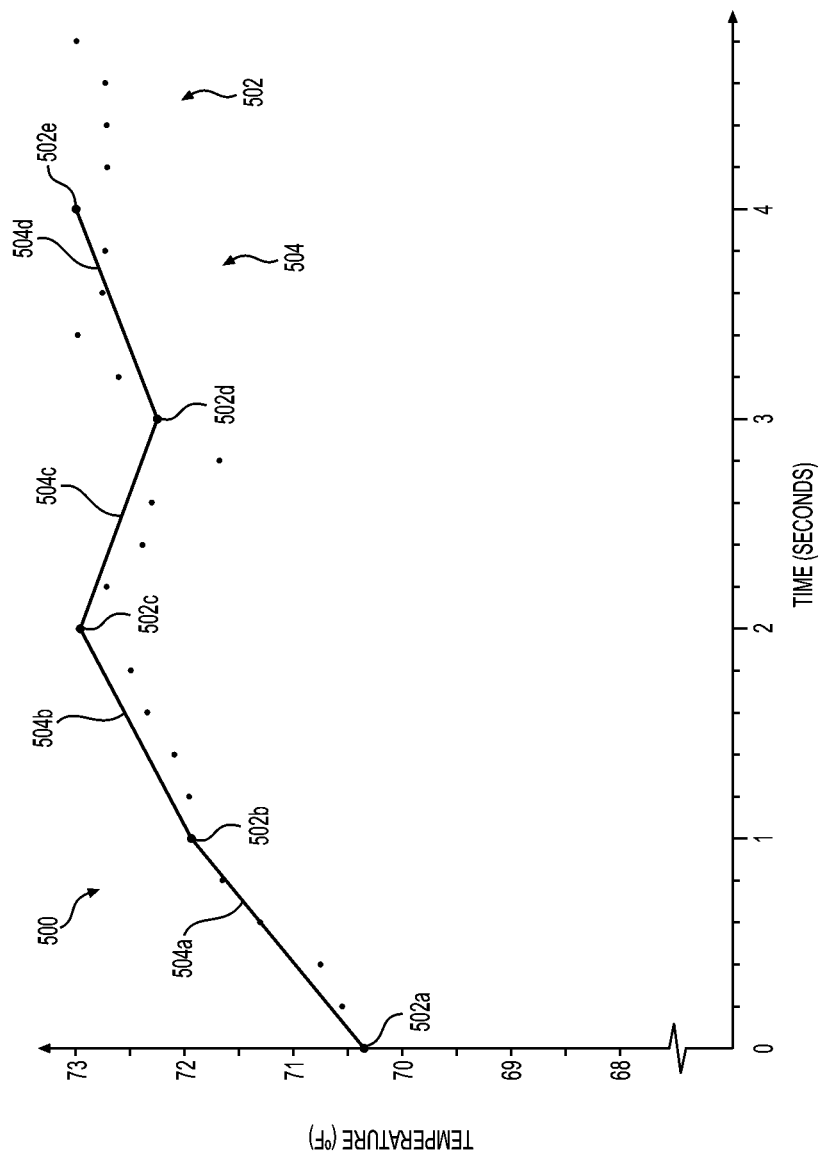
FIG. 5 is a graphical illustration of ambient temperature information according to another example embodiment of the present disclosure.

FIG. 5 is a graphical illustration 500 of ambient temperature information according to another example embodiment of the present disclosure. The graphical illustration 500 depicts a first temperature reading 502a, a second temperature reading 502b, a third temperature reading 502c, a fourth temperature reading 502d, and a fifth temperature reading 502e (collectively, temperature readings 502) that correspond to ambient temperature readings of an environment. In some examples, the temperature readings 502 may be measured by one or both of the sensors 35, 84 described in relation to FIGS. 1 and 2, and/or the thermopile 310 described in relation to FIG. 3. As noted above, the controller 52 may determine a change in ambient temperature over a time period, where the controller 52 may determine the change in ambient temperature based on a rate of change of temperature between a first time and a second time. The rate of change of the temperature, in some examples, may be represented by a slope of a line segment extending from a first temperature value at a first time, to a second temperature value at a second, later time. The controller 52 may determine a slope of the line segment by applying a linear best-fit curve between the first temperature value and the second temperature value.

In some cases, the controller 52 may apply the linear best-fit curve across temperature values collected at one or more times between the first temperature value and the second temperature value. In this example, the controller 52 may determine a first slope corresponding to a first line segment 504a between the first time 502a and the second time 502b, a second slope corresponding to a second line segment 504b between the second time 502b and the third time 502c, a third slope corresponding to a third line segment 504c between the third time 502c and the fourth time 502d, and/or a fourth slope corresponding to a fourth line segment 504d between the fourth time 502d and the fifth time 502e (collectively, line segments 504). The controller 52 may use a threshold value of +/−1 degree per second to determine whether to apply a correction factor to a patient temperature calculation (although any threshold value may be used, as described elsewhere herein). The controller 52 may determine, in this example, that the values corresponding to the slopes of the line segments 504a and 504b exceed a threshold value for change in temperature over the time period (in this case, one second). Therefore, the controller 52 may apply a correction factor to the patient temperature measured by the sensor(s) 32, 33 to account for the change in ambient temperature. As discussed above, the controller 52 may apply the correction factor according to y=mx+b (e.g., by employing a first order curve fitting, where coefficients may be predetermined and/or learned according to a machine-learned model), to account for the positive slope values of the line segments 504a and 504b that exceeded the threshold change in ambient temperature.

Figure 6:
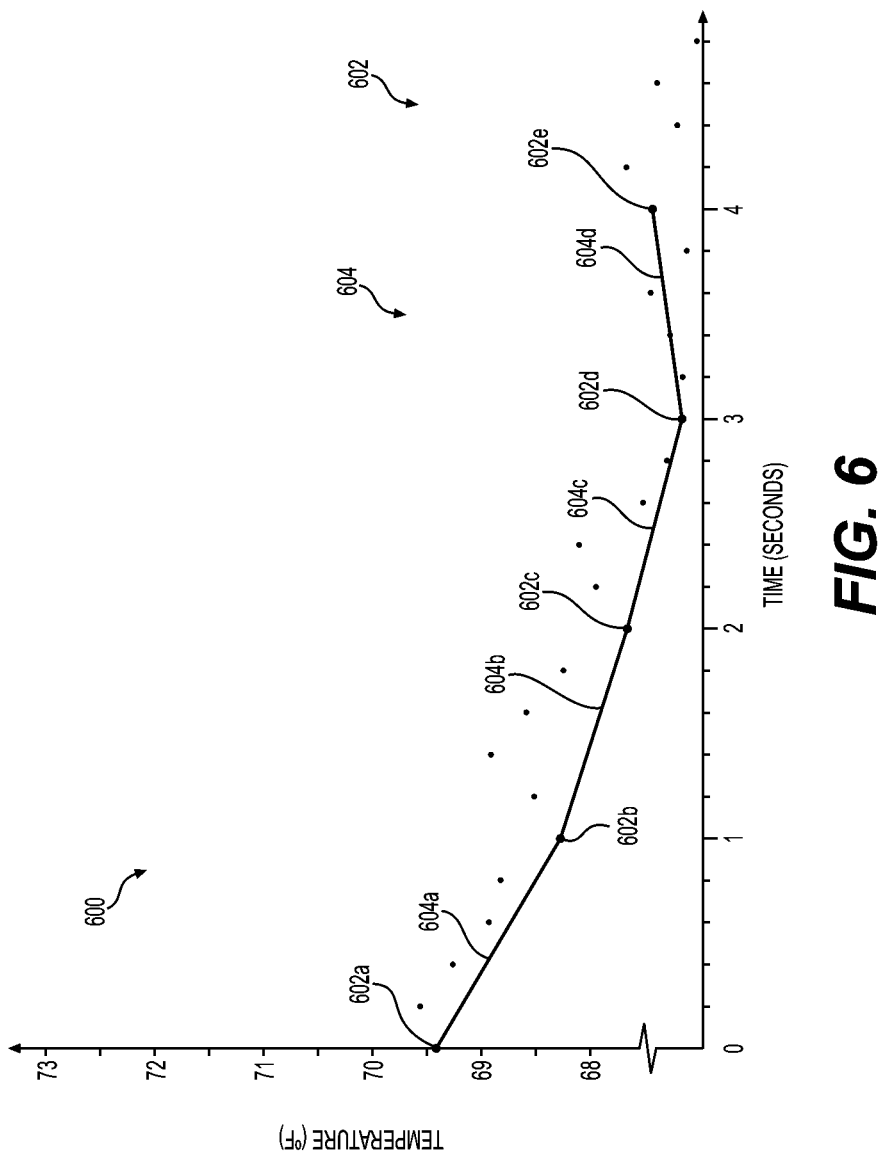
FIG. 6 is graphical illustration of ambient temperature information according to a further example embodiment of the present disclosure.

FIG. 6 is graphical illustration 600 of ambient temperature information according to a further example embodiment of the present disclosure. The graphical illustration 600 depicts a first temperature reading 602a, a second temperature reading 602b, a third temperature reading 602c, a fourth temperature reading 602d, and a fifth temperature reading 602e (collectively, temperature readings 602) that correspond to ambient temperature readings of an environment. In some examples, the temperature readings 602 may be measured by one or both of the sensors 35, 84 described in relation to FIGS. 1 and 2. As noted above, the controller 52 may determine a change in ambient temperature over a time period, where the controller 52 may determine the change in ambient temperature based on a rate of change of temperature between a first time and a second time. The rate of change of temperature, in some examples, may be represented by a slope of a line segment extending from a first temperature value at a first time and a second temperature value at a second, later time. The controller 52 may determine a slope of the line segment by applying a linear best-fit curve between the first temperature value and the second temperature value.

In some cases, the controller 52 may apply the linear best-fit curve across temperature values collected at one or more times between the first temperature value and the second temperature value. In this example, the controller 52 may determine a first slope corresponding to a first line segment 604a between the first time 602a and the second time 602b, a second slope corresponding to a second line segment 604b between the second time 602b and the third time 602c, a third slope corresponding to a third line segment 604c between the third time 602c and the fourth time 602d, and/or a fourth slope corresponding to a fourth line segment 604d between the fourth time 602d and the fifth time 602e (collectively, line segments 604). The controller 52 may use a threshold value of +/−1 degree per second to determine whether to apply a correction factor to a patient temperature calculation (although any threshold value may be used, as described elsewhere herein). The controller 52 may determine, in this example, that the values (e.g., absolute values) corresponding to the slopes of the line segments 604a, 604b, and 604c exceed a threshold value for change in temperature over the time period (in this case, one second). Therefore, the controller 52 may apply a correction factor to the patient temperature measured by the sensor(s) 32, 33 to account for the change in ambient temperature.

In some examples, the controller 52 may apply the correction factor according to y=mx+b (e.g., first order curve fitting) similar to the correction applied when the rate of change is positive as described in relation to FIG. 4, although the controller 52 may use different coefficients (e.g., different magnitude and/or different +/− sign) to account for the negative slope values of the slopes of the line segments 604a, 604b, and 604c that exceeded the threshold change in ambient temperature.

Figure 7:
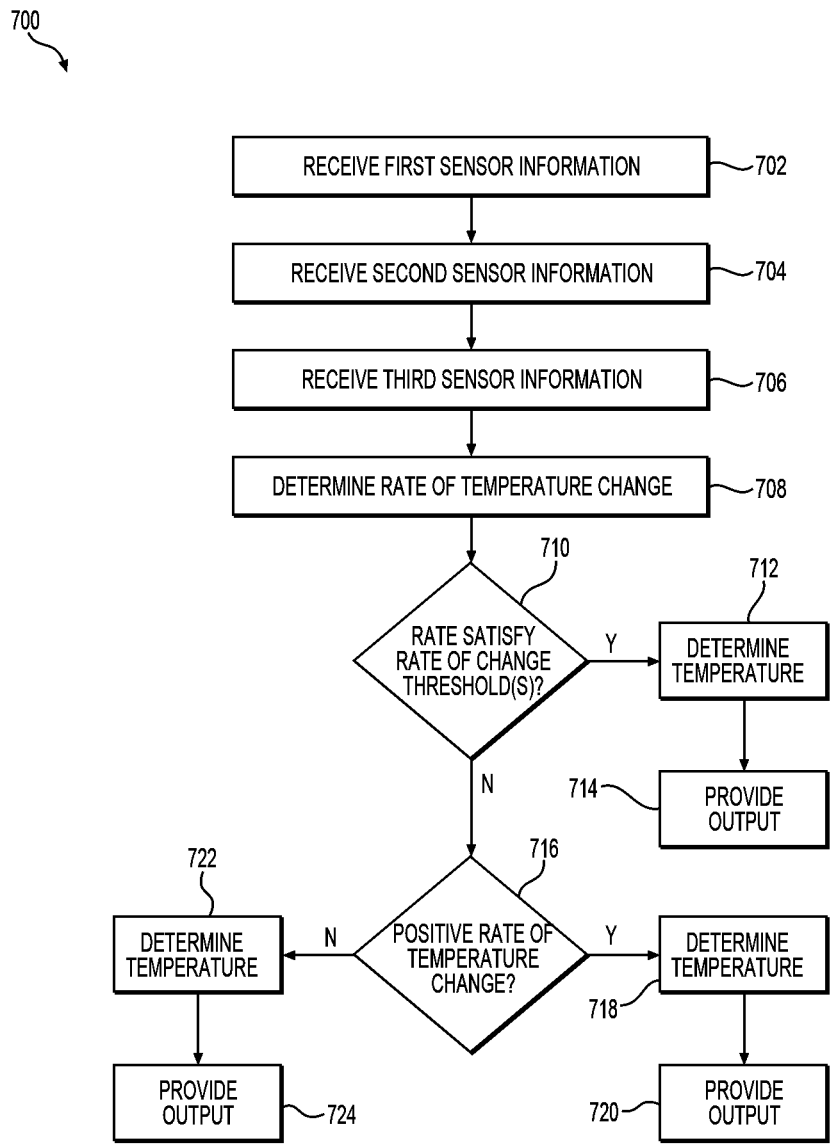
FIG. 7 illustrates a flowchart outlining an example method of the present disclosure.

FIG. 7 illustrates a flowchart outlining an example method 700 of the present disclosure. In some examples, the method 700 may be performed by one or more computing devices, such as the temperature measurement device 10 of FIG. 1. Reference will be made throughout the discussion of the method 700 to FIGS. 3-5, which show graphical illustrations of ambient temperature readings.

At operation 702, the temperature measurement device receives first sensor information. The first sensor information may correspond to the sensor 32 measuring a patient temperature of a patient as described above.

At operation 704, the temperature measurement device receives second sensor information. The second sensor information may correspond to the sensor 33 measuring a patient temperature of a patient as described above. In some examples, the temperature measurement device 10 may receive the first sensor information and/or the second sensor information responsive to an input received via the operator interface 22 to measure the temperature of a patient. The temperature measurement device 10 may receive the first sensor information and/or the second sensor information over a specified time period, such as 0.5 seconds, 1 second, 2 seconds, 3 seconds, and so forth.

At operation 706, the temperature measurement device receives third sensor information. The third sensor information may correspond to the sensor 35 and/or the sensor 84 measuring an ambient temperature of the environment. The temperature measurement device 10 may receive the third sensor information over a specified time period as well, that may at least partially overlap with the time period during which the first sensor information and/or the second sensor information is measured.

At operation 708, the temperature measurement device determines whether the third sensor information satisfies a rate of change threshold for ambient temperature of an environment. The rate of change threshold may be +/−0.5 degrees/second, +/−1 degree/second, +/−2 degrees/second, or any suitable rate of change threshold. Additionally, the rate of change threshold may be different for a positive rate of change and a negative rate of change. For instance, the rate of change threshold for a positive rate of ambient temperature change may be +0.5 degrees/second, while the rate of change threshold for a negative rate of ambient temperature change may be −1 degree/second.

If the temperature measurement device determines that the third sensor information does satisfy the rate of change threshold (e.g., an absolute value of the change in ambient temperature is less than the rate of change threshold), the process may proceed to operation 712, where the temperature measurement device determines a core temperature of the patient. In this case, the temperature measurement device 10 may determine the core temperature of the patient without applying a correction factor for ambient temperature, and the core temperature may be determined based on the first sensor information and/or the second sensor information. An operation 714 includes the temperature measurement device providing an output of the core temperature of the patient, such as via the display 54 of the temperature measurement device 10.

If the temperature measurement device determines that the third sensor information does not satisfy the rate of change threshold (e.g., an absolute value of the change in ambient temperature is greater than the rate of change threshold), the process may proceed to operation 716, where the temperature measurement device determines if the temperature change is a positive temperature change. For example, the temperature measurement device 10 may determine whether the temperature change is positive based on a slope between a first temperature measured at a first time and a second temperature measured at a second, later time is positive or negative, as discussed in relation to the graphical illustrations 300, 400, and 500.

If the temperature measurement device determines that the temperature change is positive, the process can proceed to operation 718, in which the temperature measurement device determines a core temperature of the patient based on the positive ambient temperature change. For instance, the controller 52 of the temperature measurement device 10 may apply a correction factor to the first sensor information and/or the second sensor information to account for the positive ambient temperature change in order to more accurately calculate the core temperature of the patient. For example, the controller 52 may apply the correction factor according to y=mx+b (e.g., by employing a first order curve fitting, where coefficients may be predetermined and/or learned according to a machine-learned model). An operation 720 includes the temperature measurement device providing an output of the core temperature of the patient, such as via the display 54 of the temperature measurement device 10.

If the temperature measurement device determines that the temperature change is negative, the process can proceed to operation 722, in which the temperature measurement device determines a core temperature of the patient based on the negative ambient temperature change. For instance, the controller 52 of the temperature measurement device 10 may apply a correction factor to the first sensor information and/or the second sensor information to account for the negative ambient temperature change in order to more accurately calculate the core temperature of the patient. For example, the controller 52 may apply the correction factor according to y=mx+b (e.g., first order curve fitting) similar to the correction applied when the rate of change is positive as described in operation 718, although the controller 52 may use different coefficients (e.g., different magnitude and/or different +/− sign) to account for the negative temperature change. An operation 724 includes the temperature measurement device providing an output of the core temperature of the patient, such as via the display 54 of the temperature measurement device 10.

Figure 8:
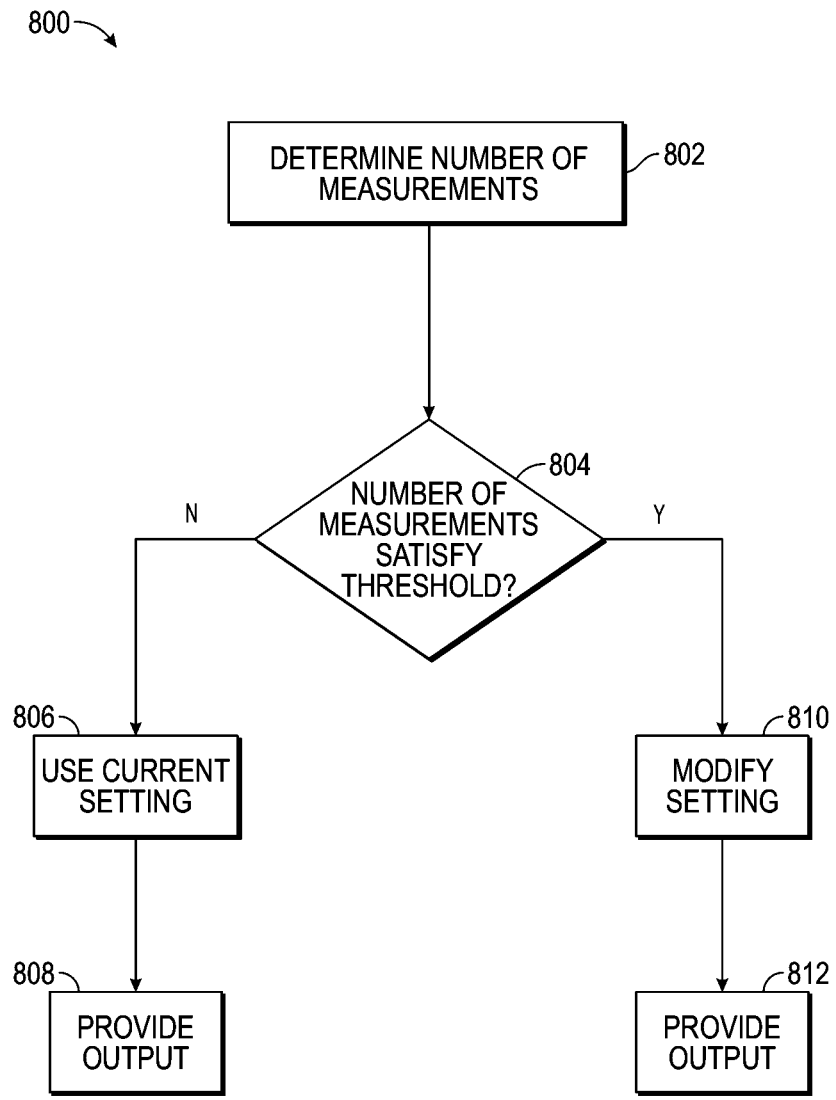
FIG. 8 illustrates an additional flowchart outlining an example method of the present disclosure.

FIG. 8 illustrates a flowchart outlining an example method 800 of the present disclosure. In some examples, the method 800 may be performed by one or more computing devices, such as the temperature measurement device 10 of FIG. 1. Reference will be made throughout the discussion of the method 800 to FIGS. 3-5, which show graphical illustrations of ambient temperature readings.

At operation 802, the temperature measurement device determines a number of temperature measurements that the temperature measurement device has taken over a time period. For example, the controller 52 may store a count of temperature measurements that the temperature measurement device 10 has collected over a predetermined amount of time (e.g., 1 minute, 2 minutes, 5 minutes, 1 hour, etc.).

At operation 804, the temperature measurement device determines whether the number of measurements satisfies a threshold number of measurements. In examples, the controller 52 may access a stored threshold number of measurements associated with the time period, such as three measurements within one minute, seven measurements within two minutes, twelve measurements within five minutes, forty measurements within one hour, to name a few examples. The threshold number of measurements may be associated with a known number of temperature measurements within a time period that cause a temperature of the temperature measurement device to increase enough to affect temperature readings of patients. The controller 52 may compare the number of measurements collected in the operation 802 over the time period to the threshold number of measurements.

If the temperature measurement device determines that the number of measurements collected by the temperature measurement device is less than the threshold number of measurements, the process 800 may proceed to an operation 806, in which the temperature measurement device uses a current setting to determine a temperature of the patient. For example, if the number of measurements is less than the threshold, the controller 52 may prevent a correction factor for ambient temperature associated with the temperature measurement device from being applied. An operation 808 includes the temperature measurement device providing an output of the core temperature of the patient, such as via the display 54 of the temperature measurement device 10.

If the temperature measurement device determines that the number of measurements collected by the temperature measurement device is greater than or equal to the threshold number of measurements, the process 800 may proceed to an operation 810, in which the temperature measurement device modifies a setting to determine a temperature of the patient. For example, the controller 52 may activate a Peltier cooler within the temperature measurement device 10 to reduce an internal temperature of the temperature measurement device 10, thus reducing the likelihood of inaccurately high patient temperature readings. Alternatively or additionally, the controller 52 may increase the correction factor applied to the first sensor information and/or the second sensor information to account for the positive ambient temperature change in addition to the increased temperature of the temperature measurement device 10 due to multiple successive readings, in order to more accurately calculate the core temperature of the patient.

Other embodiments of the present disclosure will be apparent to those skilled in the art from consideration of the specification and practice of the embodiments described herein. It is intended that the specification and examples be considered as example only, with a true scope and spirit of the present disclosure being indicated by the following claims.

What is claimed is:

1. A temperature measurement device, comprising:
a first sensing element, comprising a first type of temperature sensor, configured to sense an ambient temperature of an environment over a first time period;
a second sensing element, comprising a second type of temperature sensor different from the first type of temperature sensor, configured to sense a patient temperature of a patient over a second time period;
a controller in communication with the first sensing element and the second sensing element, the controller being configured to:
determine a first rate of change of the ambient temperature over the first time period;
determine a second rate of change of the patient temperature over the second time period, wherein the first time period and the second time period at least partially overlap;
determine a threshold rate of change;
select a first correction factor based at least in part on determining that the first rate of change exceeds the threshold rate of change;
determine a core temperature of the patient by applying the first correction factor to the second rate of change of the patient temperature in response to the first rate of change exceeding the threshold rate of change;
select a second correction factor based at least in part on determining that the first rate of change is less than the threshold rate of change; and
determine the core temperature of the patient by applying the second correction factor to the second rate of change of the patient temperature in response to the first rate of change being below the threshold rate of change.

2. The temperature measurement device of claim 1, wherein the second sensing element is configured to sense the patient temperature inside of body cavity of the patient, and wherein the first sensing element is configured to sense the ambient temperature outside of the body cavity of the patient.

3. The temperature measurement device of claim 2, wherein the temperature measurement device comprises a handle, and wherein the first sensing element is spaced away from the handle.

4. The temperature measurement device of claim 1, wherein at least a portion of the first time period is prior to the second time period.

5. The temperature measurement device of claim 1, wherein the threshold rate of change is a first threshold rate of change and the correction factor is a first correction factor, and the wherein the controller is further configured to:
determine that the first rate of change is less than a second threshold rate of change; and
select a second correction factor based at least in part on determining that the first rate of change is less than the second threshold rate of change,
wherein the controller is configured to determine the core temperature of the patient based at least in part on applying the second correction factor to the second rate of change of the patient temperature.

6. The temperature measurement device of claim 1, wherein the controller is further configured to:
determine that the first rate of change is less than the threshold rate of change; and determine the core temperature of the patient based at least in part on the second rate of change of the patient temperature.

7. The temperature measurement device of claim 1, wherein determining the first rate of change comprises:
   determining a linear best-fit curve based at least in part on a first temperature reading during the first time period and a second temperature reading during the second time period, and
   determining a slope of the linear best-fit curve.

8. The temperature measurement device of claim 7, wherein one or more coefficients of the linear best-fit curve are determined using a machine-learned model.

9. The temperature measurement device of claim 1, wherein the controller is further configured to:
   determine a number of temperature measurements taken by the temperature measurement device over a predetermined period of time;
   determine, in response to the number of temperature measurements being below a predetermined threshold, to take a next temperature measurement using a current setting for the temperature measurement device; and
   determine, in response to the number of temperature measurements being at or above the predetermined threshold, to take the next temperature measurement using a modified setting, wherein the modified setting comprises at least one of:
      activating a cooling device within the temperature measurement device; or
      modifying a value of a correction factor applied to the ambient temperature or the patient temperature.

10. The temperature measurement device of claim 1, further comprising a third sensing element configured to sense the ambient temperature of the environment over the first time period.

11. The temperature measurement device of claim 10, further comprising a body coupled to a handle portion and a tip portion, the tip portion comprising the second sending element, and wherein:
   the first sensing element is disposed on the body, away from the handle such that first data from the first sensing element is independent of a first impact from a hand of a user;
   the third sensing element is disposed on a lateral side of the tip portion such that third data from the third sensing element is independent of proximity of a patient; and
   the first rate of change of the ambient temperature is based on the first sensing element and the third sensing element.

12. A method of determining a core temperature of a patient, the method comprising:
   sensing, by a first sensing element comprising a thermistor, an ambient temperature of an environment over a first time period;
   sensing, by a second sensing element comprising an infrared temperature sensing element, a patient temperature over a second time period, wherein the first time period and the second time period at least partially overlap;
   determining a first rate of change of the ambient temperature over the first time period;
   determining a second rate of change of the patient temperature over the second time period;
   determining a threshold rate of change;
   selecting a first correction factor based at least in part on determining that the first rate of change exceeds the threshold rate of change;
   determining the core temperature of the patient by applying the first correction factor to the second rate of change of the patient temperature in response to the first rate of change exceeding the threshold rate of change;
   selecting a second correction factor based at least in part on determining that the first rate of change is less than the threshold rate of change; and
   determining the core temperature of the patient by applying the second correction factor to the second rate of change of the patient temperature in response to the first rate of change being less than the threshold rate of change.

13. The method of claim 12, wherein the second sensing element is configured to sense the patient temperature inside of body cavity of the patient, and wherein the first sensing element is configured to sense the ambient temperature outside of the body cavity of the patient.

14. The method of claim 13, wherein the first sensing element and the second sensing element are part of a temperature measurement device further comprising a handle, and wherein the first sensing element is spaced away from the handle.

15. The method of claim 12, wherein at least a portion of the first time period is prior to the second time period.

16. The method of claim 12, wherein determining the first rate of change comprises:
   determining a linear best-fit curve based at least in part on a first temperature reading during the first time period and a second temperature reading during the second time period, and
   determining a slope of the linear best-fit curve.

17. A method of manufacturing a temperature measurement device, comprising:
   providing a first sensing element, comprising a thermistor, configured to detect an ambient temperature of an environment;
   providing a second sensing element, comprising an infrared temperature sensing element, configured to detect a patient temperature of a patient;
   associating a controller with at least one of the first sensing element and the second sensing element; and
   programming the controller to determine a core temperature of the patient based on determining a first rate of change of the ambient temperature over a first time period, determine a second rate of change of the patient temperature over a second time period that at least partially overlaps the first time period, determine a threshold rate of change, select a first correction factor based at least in part on determining that the first rate of change exceeds the threshold rate of change, determine the core temperature of the patient based at least in part on applying the first correction factor to the second rate of change of the patient temperature in response to the first rate of change exceeding the threshold rate of change, selecting a second correction factor based at least in part on determining that the first rate of change is less than the threshold rate of change, and determining the core temperature of the patient by applying the second correction factor based at least in part on determining that the first rate of change is less than the threshold rate of change.

18. The method of claim 17, wherein the controller is further programmed to:

determine that the first rate of change is less than the threshold rate of change; and determine the core temperature of the patient based at least in part on the second rate of change of the patient temperature.

19. The method of claim 17, wherein the second sensing element is configured to sense the patient temperature inside of a body cavity of the patient, and wherein the first sensing element is configured to sense the ambient temperature outside of the body cavity of the patient.

20. The method of claim 19, wherein the temperature measurement device further comprises a handle, and wherein the first sensing element is spaced away from the handle.

21. The method of claim 17, wherein at least a portion of the first time period is prior to the second time period.

* * * * *